United States Patent
Monot et al.

(10) Patent No.: US 6,205,341 B1
(45) Date of Patent: Mar. 20, 2001

(54) PROCESS FOR ADJUSTING THE TRANSMISSION AND RECEPTION CHAINS OF THE PATHS BY A BASE STATION OF A SYSTEM FOR RADIO COMMUNICATION BETWEEN MOBILES

(75) Inventors: Jean-Jacques Monot, Courdimanche; Robert Berranger, Elancourt; Gilbert Multedo, Vaureal Cergy, all of (FR)

(73) Assignee: Thomson-CSF, Paris (FR)

( * ) Notice: Subject to any disclaimer, the term of this patent is extended or adjusted under 35 U.S.C. 154(b) by 0 days.

(21) Appl. No.: 08/973,758

(22) PCT Filed: Jun. 18, 1996

(86) PCT No.: PCT/FR96/00934

§ 371 Date: Dec. 23, 1997

§ 102(e) Date: Dec. 23, 1997

(87) PCT Pub. No.: WO97/01226

PCT Pub. Date: Jan. 9, 1997

(30) Foreign Application Priority Data

Jun. 23, 1995 (FR) .................................................. 95 07587

(51) Int. Cl.[7] ....................................................... H04B 1/38
(52) U.S. Cl. .......................... 455/562; 455/101; 455/132; 455/277.1; 455/504
(58) Field of Search .................................. 455/562, 504, 455/506, 101, 102, 103, 132, 133, 277.1; 342/362, 372, 378; 375/229, 233, 347, 299; 370/203, 252

(56) References Cited

U.S. PATENT DOCUMENTS

| 4,903,032 | 2/1990 | Multedo et al. . |
| 5,515,378 | * 5/1996 | Roy et al. ............................ 370/203 |

* cited by examiner

Primary Examiner—Lee Nguyen
(74) Attorney, Agent, or Firm—Oblon, Spivak, McClelland, Maier & Neustadt, P.C.

(57) ABSTRACT

A process which adjusts the transmission and reception chains of the paths formed by a base station of a system for radio communication between mobiles which after calibration of the antenna base adjusts the reception chains relating to each path by distributing a first specified adjustment signal synchronously over each of the reception chains and calculating an equalization filter which inverts the transfer functions related to each reception chain. The process next adjusts the transmission chains related to each path by distributing a second specified adjustment signal synchronously over each of the transmission chains, by extracting from each of the paths a part of a transmission signal before the transmission signal is sent to the antenna base so as to re-inject that part of the transmission signal into the reception chains, and by calculating an equalization filter which inverts the transfer functions related to each transmission chain. Finally, the process receives via the equalization filters previously calculated for the reception chains reception signals originating from the antenna base, or transmits via the equalization filters previously calculated for the transmission chains the transmission signals originating from the multipath transmission/reception device.

20 Claims, 5 Drawing Sheets

PROCESS FOR ADJUSTING THE TRANSMISSION AND RECEPTION CHAINS OF THE PATHS BY A BASE STATION OF A SYSTEM FOR RADIO COMMUNICATION BETWEEN MOBILES

BACKGROUND OF THE INVENTION

1. Field of the Invention

The present invention relates to a process and an implementation device for adjusting the transmission and reception chains of the paths formed by a multipath transmission/reception device of a base station of a radiocommunications system, using in particular a multipath transmission/reception technique known by the abbreviation SDMA standing for "Space-Division Multiple Access".

2. Discussion of the Background

Systems for radiocommunication with mobiles are mostly based on the cellular network concept in which a base station communicates with a number of mobiles within the cell for which it is responsible.

For transmitting and receiving signals, base stations currently use only simple antenna systems, either of the single-sensor or multi-sensor type, with RF combination to ensure complete coverage, or else of the two-sensor type with selection to obtain space diversity in reception.

The concept of SDMA, now widely reported in the literature, is aimed at increasing the capacity of a base station by performing multipath transmission and reception in an adaptive and intelligent manner.

However, the setting up of this technique runs up against problems of implementation and of control of the distortions in the transmission and reception chains. In particular, the most disturbing phenomenon is the phase and amplitude dematching of the paths. During reception, this phenomenon will prevent a correct location fix on the mobile and hence the allocation of an SDMA frequency. During transmission, this problem may cause the transmission of a signal in an undesired direction.

The techniques for alleviating these problems are well known in respect of reception, since they are implemented in radio direction finders and consist in performing a calibration of the antenna base followed by frequent adjustment of the reception paths.

During transmission, the problem is more complex since it involves adjusting the transmission paths (after calibration of the antenna base) while being independent of the structure of the antenna base.

SUMMARY OF THE INVENTION

The aim of the invention is to alleviate the aforesaid drawbacks.

To this end, the subject of the invention is a process allowing the regular adjusting of the transmission and reception chain of each of the paths formed by a base station of a system for radio communication with mobiles, including a transmission/reception antenna base and a multipath transmission/reception device, characterized in that it consists after a step of calibration of the antenna base:

within a step for adjusting the reception chains relating to each path, in distributing a first specified adjustment signal, synchronously over each of the reception chains, in calculating an equalization filter inverting the transfer functions relating to each reception chain, within a step for adjusting the transmission chains relating to each path, in distributing a second specified adjustment signal, synchronously over each of the transmission chains, in extracting from each of the paths a part of the transmission signal before it is sent to the antenna base so as to re-inject it into the reception chains, and in calculating an equalization filter inverting the transfer functions relating to each transmission chain, in performing the reception of the signals originating from the antenna base via the equalization filters previously calculated for the reception chains, or the transmission of the signals originating from the multipath transmission/reception device via the equalization filters previously calculated for the transmission chains.

The present invention has the advantage of adjusting the transmission and reception paths of a radiocommunication system utilizing an SDMA technique, making it possible to ensure the control of the wavefront of the signals received and transmitted by the system by using adjustment signals which avoid the phenomena of coupling between antennas.

BRIEF DESCRIPTION OF DRAWINGS

Other advantages and characteristics of the present invention will emerge more clearly on reading the description which follows given in conjunction with the appended figures which represent.

DESCRIPTION OF THE PREFERRED EMBODIMENTS

Figure 1:
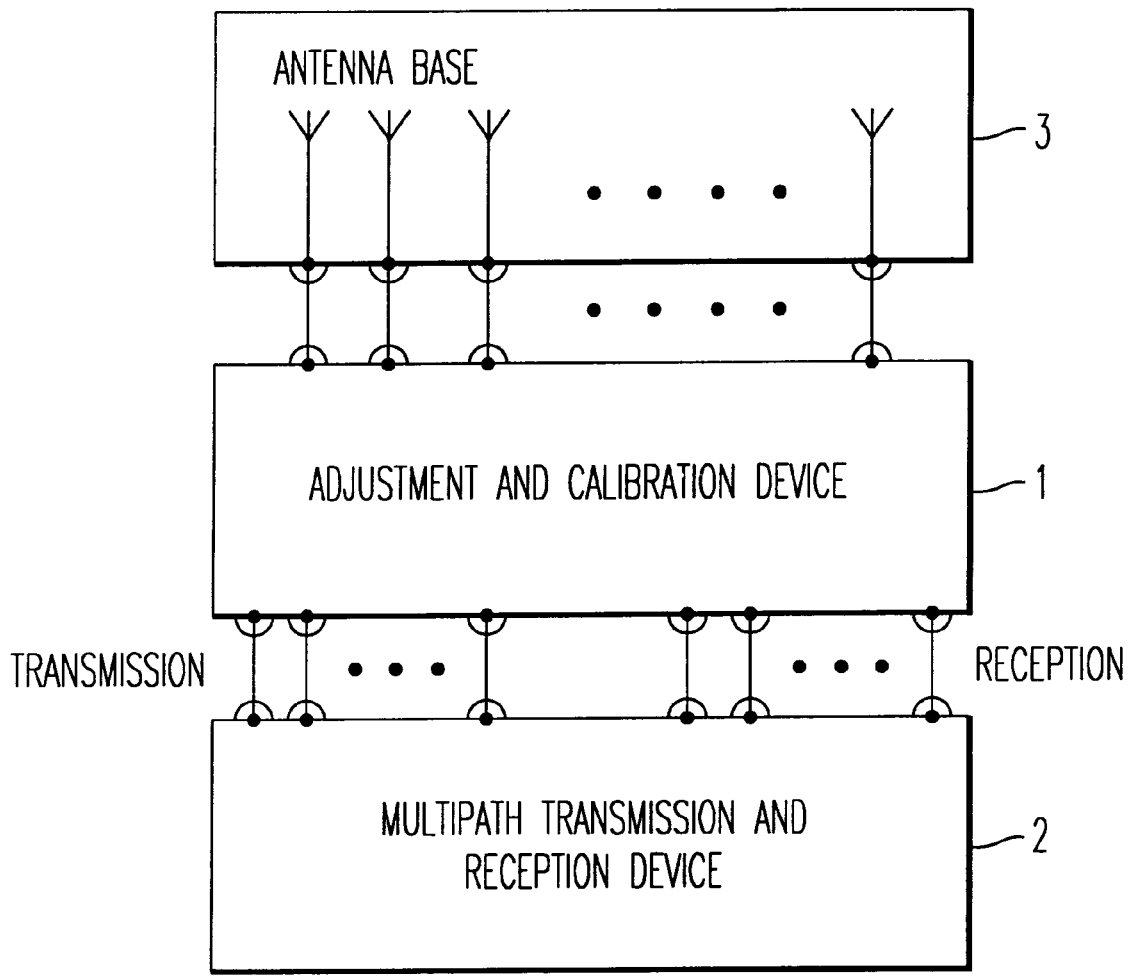
FIG. 1, a radiocommunication system incorporating a device for implementing the process according to the invention, FIG. 2, a schematic diagram of the process according to the invention, FIG. 3, a functional diagram of a device for implementing the process according to the invention, FIG. 4, a frequency and time representation of the signal for adjusting the transmission chains, FIG. 5, a first solution for dividing the carriers inside the useful band, FIG. 6, a second solution for dividing the carriers inside the useful band, FIGS. 7a and 7b, respectively the linear zone of the amplification of the transmission chains, and the effect of phase distortion as a function of the amplitude of the modulating envelope, and FIG. 8, a functional diagram corresponding to the stage of pre-correction of the amplification of the transmission chain.

A device 1 implementing the process according to the invention is interfaced between an SDMA transmission/reception device 2 and an antenna base 3, as indicated in FIG. 1.

Consequently it is independent of the SDMA processing performed by the ad hoc device and implements as many transmission paths and reception paths as antennas.

Figure 2:
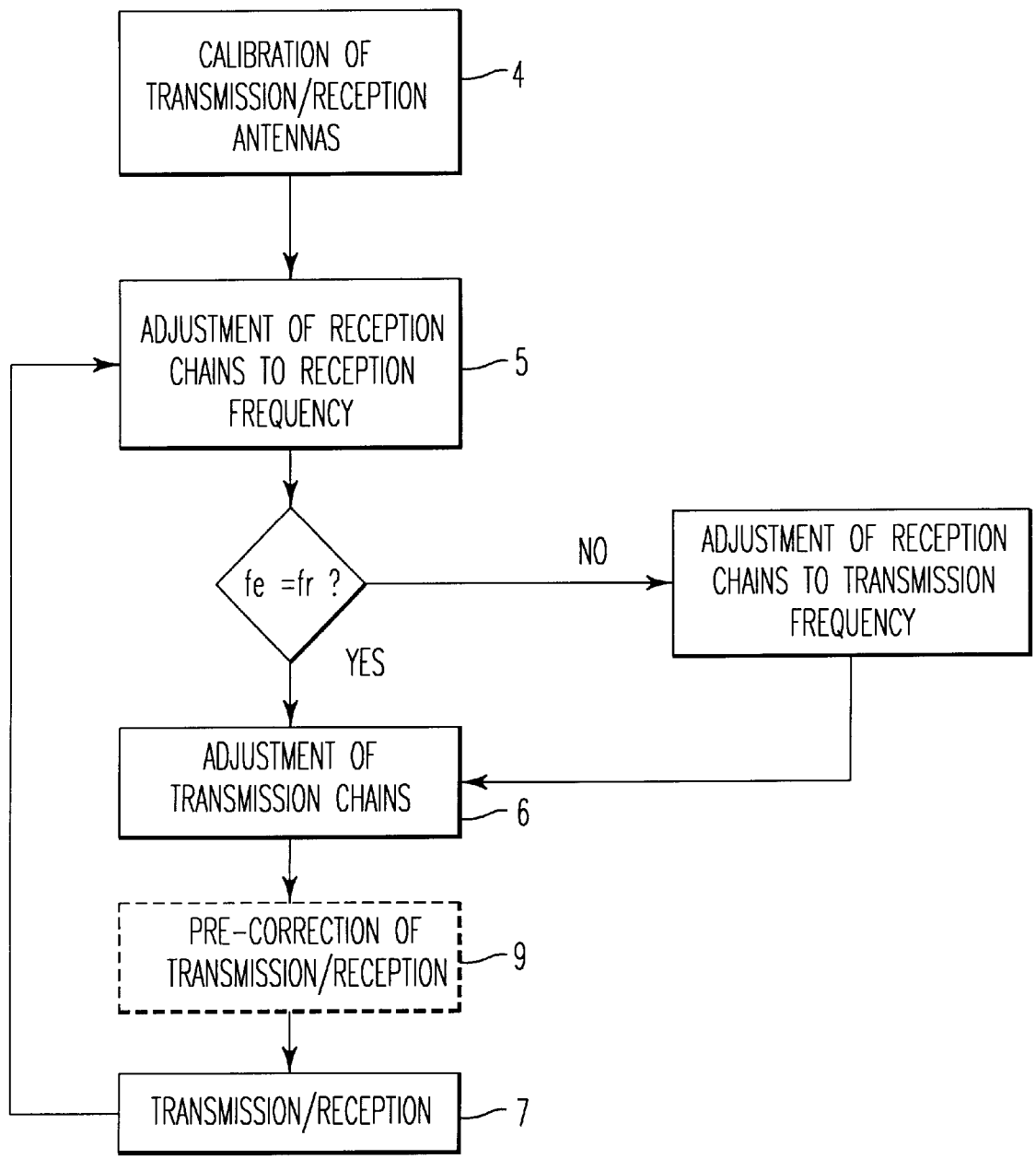

FIG. 2 illustrates a schematic diagram of the process according to the invention.

After a first step 4 of calibration of the antennas of the antenna base, the process according to the invention consists within a second step 5, in adjusting the reception chains relating to each path, and then within a third step 6, in adjusting the transmission chains relating to each path.

Having performed the adjustment, within a fourth step 7, the reception or transmission of the signals respectively received by the antenna base 3 or transmitted by the transmission/reception device 2 is performed.

In step 8, in the case in which the frequencies of the reception and transmission signals are different, the reception chains of each of the paths are adjusted to the frequency of the transmission signal.

To alleviate the non-linearity of the amplification chains on transmission, a step 9 allows a pre-correction of these chains.

Figure 3:
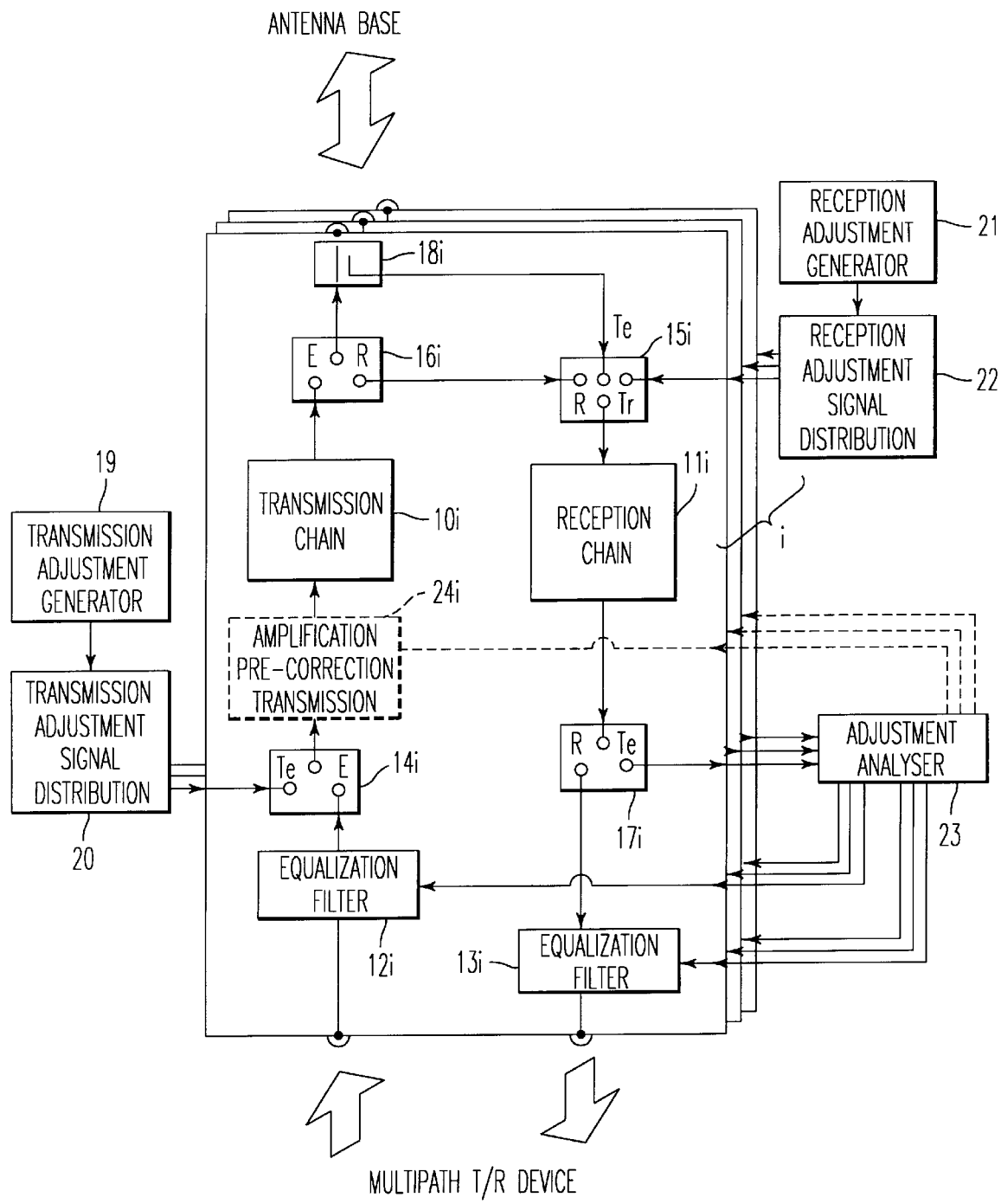

An adjustment device for implementing the process according to the invention is illustrated by the functional diagram of FIG. 3.

It is interfaced between the multipath transmission/reception device 2, especially of SDMA type, and the antenna base 3. To each antenna, not represented, there corresponds a path formed in respect of transmission and reception. In the figure, three paths i with i=1 to 3 are represented respectively by three superimposed planes.

Each path i includes:
- a transmission 10i and reception 11i chain,
- an equalization filter 12i for the transmission signal input-coupled to the transmission chain 10i,
- an equalization filter 13i for the reception signal output-coupled to the reception chain 11i,
- an input switch 14i and 15i and output switch 16i and 17i for the transmission chain 10i and the reception chain 11i respectively enabling the device to enter the various modes of operation: reception adjustment, transmission adjustment, transmission/reception,
- a coupler 18i placed at the output of the transmission chain 10i after the output switch 16i of the transmission chain 10i making it possible to extract a part of the transmission signal before it is sent to the antenna base 3 so as to inject it at the input of the reception chain 11i via the input switch 15i of the reception chain 11i.

The transmission equalization filter 12i is placed at the input of path i, before the input switch 14i of the transmission chain 10i, and the reception equalization filter 13i is placed at the output of path i, after the output switch 17i of the reception chain The device next includes in common for all the paths i:
- a first generator 19 of a signal for adjusting the transmission chains 10i which is coupled to a first distribution module 20 distributing a first specified adjustment signal over the transmission chains 10i of each of the paths i by way of the input switch 14i of the transmission chain 10i, placed at the output of the equalization filter 12i. The adjustment signal can be generated directly in the multipath transmission/reception device.
- a second generator 21 of a signal for adjusting the reception chains 11i which is coupled to a second distribution module 22 distributing a second specified adjustment signal over the reception chains of each of the paths i by way of the input switch 15i of the reception chain 11i, and
- an analyser of the adjustment signals 23 allowing analysis of the various adjustment signals so as to adapt the respective equalization filters 12i and 13i to the transmission 10i and reception 11i chains.

The device can furthermore include a stage for pre-correction 24 of the transmission chains which is placed between the equalization filter 12i and the transmission chain 10i and is represented with dashed lines in the figure.

The adjustment analyser 23 likewise in this case allows analysis of the correction signals.

A detailed description of the operation of the adjustment device for implementing the process according to the invention is given below:

The adjustment 5 of the reception chains 11i is aimed at correcting the drifting of the transfer functions of the reception chains 11i. This drifting is due mainly to the variations in temperature inside the equipment.

The equalization filters 13i at the output of the reception chains 11i have transfer functions, the alterations in which must consequently be followed, by performing an adjustment 5 cyclically.

The adjustment 5 is performed by injecting an adjustment signal whose characteristics are assumed to be known, and by making measurements whereby it is possible to determine the transfer functions so that they can be corrected. To simplify the measurements, the adjustment signal is made up of several carriers which make it possible to perform frequency discretization of the transfer functions.

The processing operations performed in a processor of the SDMA transmission/reception device being sensitive to the differential gaps from one path i to another, it is not the absolute transfer functions which must be corrected but merely the differential gaps from one path i to another.

Denoting by $H_i(f)$ the transfer function of path i, and $m_i$ the vector of measured complex gains, we obtain:

$$\underline{m}_i(k) = \frac{H_i(f_k)}{H_1(f_k)} k = 1, ..., N \quad (1)$$

path 1 serving as reference, $f_k$ being the frequencies used to make the measurements and N the number of carriers used.

Measurement of the responses of the equalization filters 13i to the various frequencies can be performed by FFT, standing for "Fast Fourier Transform" or DFT, standing for "Discrete Fourier Transform". It is preferable to perform them in succession and to use a DFT to perform the measurement, so as to avoid any problem of intermodulation. In the case of a measurement by FFT, the frequencies used must be located orthogonally, that is to say with a frequency gap equal to the inverse of the duration of the FFT measurement.

It is therefore necessary to calculate a set of p coefficients of an FIR filter, $w_i$, standing for "Finite Impulse Response Filter" for each of the reception chains 11i, in such a way that:

$$\left(\frac{H_i(f_k)}{H_1(f_k)}\right) \cdot H_{w_i}(f) \approx 1 \quad (2)$$

for every f belonging to the useful band.

The transfer function $H_{w_i}(f)$ is obtained as follows:

$$H_{w_i}(f) = \sum_{l=1}^{p} w_i(l) \cdot e^{2j\pi f l} \quad (3)$$

Since the differential transfer functions are known only for a discrete collection of frequencies $\{f_k\}$, a simple way of obtaining $w_i$ consists in minimizing in the least squares sense the error between the desired transfer function and that of an FIR filter with p coefficients, for all the measured frequencies, i.e.:

$$\min_{\underline{w}_i} \| \underline{m}'_i - F \cdot \underline{w}_i \|^2 \quad (4)$$

with:

$$\underline{m}'_i(k) = \frac{1}{\underline{m}_i(k)}$$

and F a p×N matrix such that:

$$F(m,n)=\exp(-2.j.\pi.f_m.n) \quad (5)$$

where m and n respectively represent the mth row and nth column of the matrix, $f_m$ being the mth normalized adjustment frequency.

This leads to the solution:

$$w_i=[F^+.F]^{-1}.F^+.m'_i \quad (6)$$

where "+" corresponds to the operation of conjugate transposition.

The attraction of such an approach lies in the fact that the matrix $[F^+.F]^{-1}.F^+$ (of dimension p×N) is constant and hence can therefore be calculated once and for all, this making it easy and inexpensive in terms of computation power to obtain $w_i$.

A compromise is then apparent with regard to the number of coefficients p. A large value of the latter (that is to say close to N) leads to a small quadratic error but to a large instability in the transfer function between the measured frequencies $f_k$.

An optimal value lies between N/2 and N/3, this ensuring a correction to within 0.50° and 0.1 dB.

The filter lii must also be convolved with a band-pass filter so as to ensure attenuation outside the useful band.

The main problem posed in respect of the adjustment of the transmission chains 10*i* is to render the device 1 independent of the antenna base 3 to which it is connected. This independence makes it possible to use various kinds of antenna base 3 for the SDMA function (pentagonal, linear antenna base etc.).

The step 6 of adjusting the transmission paths of the process according to the invention consists in performing beforehand a calibration of the antenna base at the transmission frequency fe so as to obtain a calibration table. Having performed this calibration, adjustment is performed in a regular manner (as for reception) so as to follow the variations in the mismatching of the transmission chains 10*i* over time.

To do this, the transmission signal is extracted, with the aid of the coupler 18*i*, situated at the output of the device 1. This signal is re-injected into the previously adjusted reception chain 11*i*.

In the case of duplex operation on different frequencies for transmission fe and reception fr, it is necessary to allow the reception, by the reception chains 11*i*, of the transmission frequency fe, and to adjust the reception chains 11*i* to this frequency fe.

In order to avoid any problem of coupling between the antennas of the antenna base 3, which may impair the measurement (since the antenna base 3 is not disconnected), the same adjustment signal must not be injected into each of the transmission chains 10*i* since this would lead to the reception on a path i of the signal transmitted by the other paths i, via the antenna base 3.

A solution according to the invention consists in dispatching, on each of the transmission chains 10*i* different adjustment signals including carriers located orthogonally: one carrier at the frequency $f_1$ for the transmission chain 10$_1$ of path 1, one carrier at the frequency $f_2$ for the transmission chain 10$_2$ of path 2, and one carrier at the frequency $f_N$ for the transmission chain 10$_N$; the gap between the carriers is fixed by the duration of observation T of the measurement. These signals are transmitted synchronously over each of the paths i so as to allow accurate phase measurement. This synchronism demands:

a digital adjustment generator 19 common to the various paths i, analogue/digital converters, not represented, using the same sampling clock, and a common frequency reference distributed over each of the paths i in respect of the transposition functions.

Figure 4:
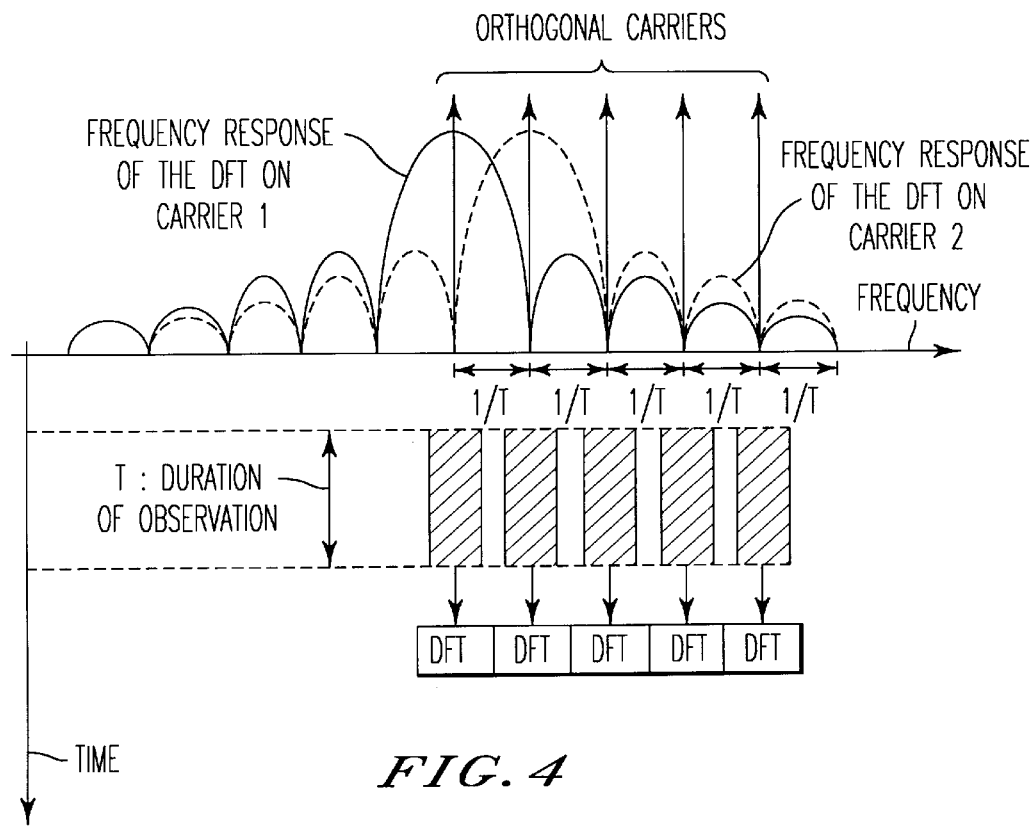

As represented in FIG. 4, the principle of orthogonality consists in selecting frequencies 1/T such that their frequency gap is inversely equal to the duration of observation T. Thus, if detection of the carriers by DFT or FFT is performed, with no weighting window, the frequency response is such that the other carriers lie at the minima of this response (sinx/x).

Two solutions can be envisaged, depending on the level of distortion created by the transmission chain 10*i*. If the latter creates only a fixed phase shift for the whole of the useful band, the first solution is to generate as many carriers as paths i, while locating them as close as possible to the centre of the useful band.

Figure 5:
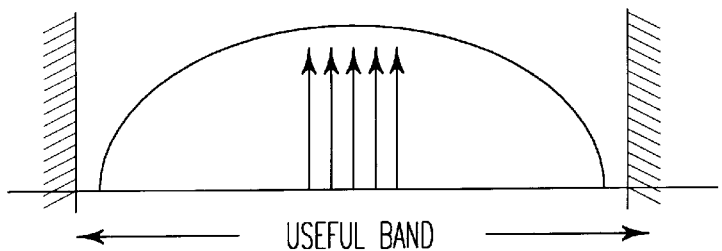

This first solution is illustrated by FIG. 5.

Let $m_i$ be the differential complex gain measured for path i, then the equalization filter 12*i* exhibits a complex gain equal to:

$$m'_i=1/m_i \quad (7)$$

If the transmission chains 10*i* cause large phase and amplitude distortions within the useful band, the equalization filter 12*i* performs a filtering operation. The method used is therefore the same as for the adjustment 5 on reception, but this time with measurements performed in sub-ranges, but still with different frequencies for each of the transmission paths.

Figure 6:
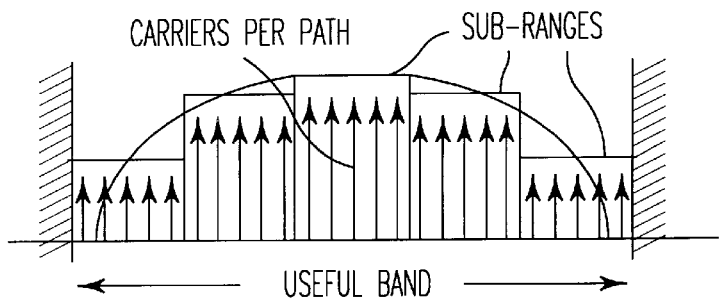

This second solution is illustrated by FIG. 6.

Let $m_i$ be the vector of differential complex gains measured for each of the sub-ranges of path i, then the equalization filter 12*i* of path i is an FIR filter whose vector of coefficients can be written according to the following equation:

$$w_i=[F^+.F]^{-1}.F^+.m'_i \quad (8)$$

with m'$_i$ the vector of inverse complex gains.

Figure 7A:
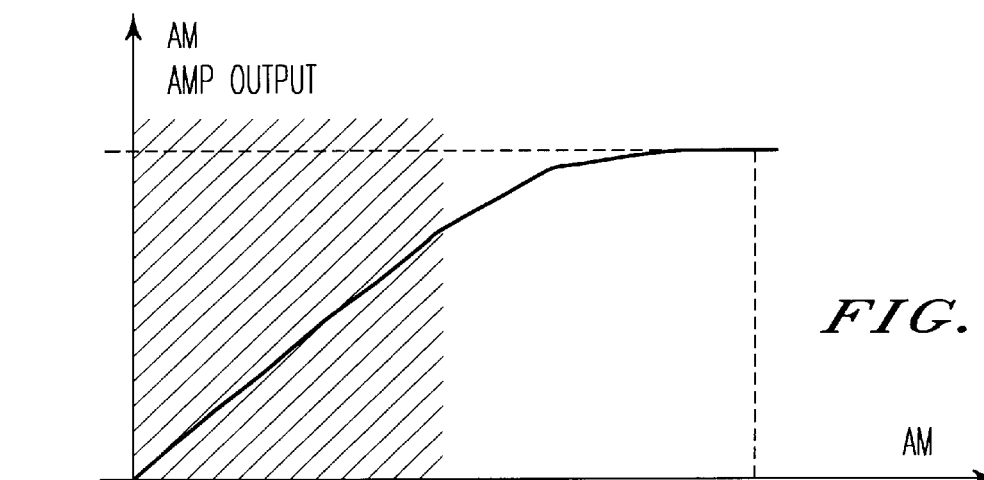

All the adjustment measurements are performed in the linear zone of the amplifiers, which are not represented, of the various transmission chains 10*i*. Unfortunately, the amplifiers used have linear amplification in a restricted zone of input level, as illustrated in FIG. 7*a*.

Figure 7B:
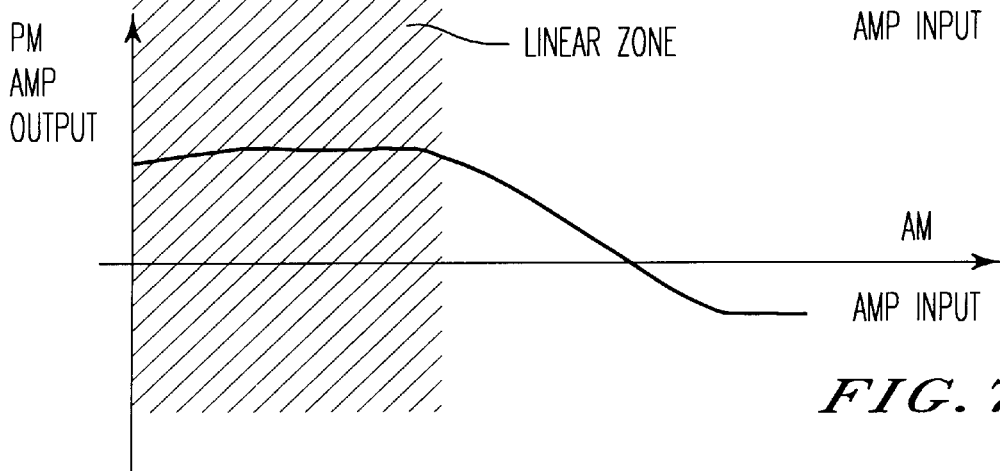

Indeed, the amplifiers cause PM phase and AM amplitude distortion which depends only on the amplitude of the modulating envelope, as illustrated in FIG. 7*b*.

The SDMA transmission/reception device 2 carries out the formation of beams by combining several transmissions with complex weightings which differ from one path to another. The consequence of this is that signals are input to the amplifiers of the transmission chains 10*i*, having different levels on each path i. Thus, the operating points of the amplifiers are not the same, this giving rise to a different phase distortion for each path i.

In order to alleviate this problem of phase and amplitude distortion, the process according to the invention performs a pre-correction 9 of the transmission chains 10*i*. This is achieved with the aid of phase and amplitude measurement of the transfer function of the amplifiers with the help of a pre-correction stage 24i. The measurement consists in performing detection of the instantaneous amplitude, as well as of the instantaneous phase of the modulating signal. In the case of baseband processing:

$$\rho_k = \sqrt{I_k^2 + Q_k^2} \quad (9)$$

$$\theta_k = \arctan\left(\frac{I_k}{Q_k}\right)$$

where $\rho_k$: instantaneous modulus of the signal $\theta_k$: instantaneous phase of the signal i.e.:

$$I_k = \rho_k \cdot \cos(\theta_k) \quad Q_k = \rho_k \cdot \sin(\theta_k) \quad (10)$$

$I_k$ and $Q_k$ representing respectively the complex phase and phase quadrature signals.

The transfer functions of the amplifiers will be called f and g:

$$\rho_{out} = f(\rho_{in}) \quad \theta_{out} = \theta_{in} + \Delta\theta_k = \theta_{in} + g(\theta_{in}) \quad (11)$$

Figure 8:
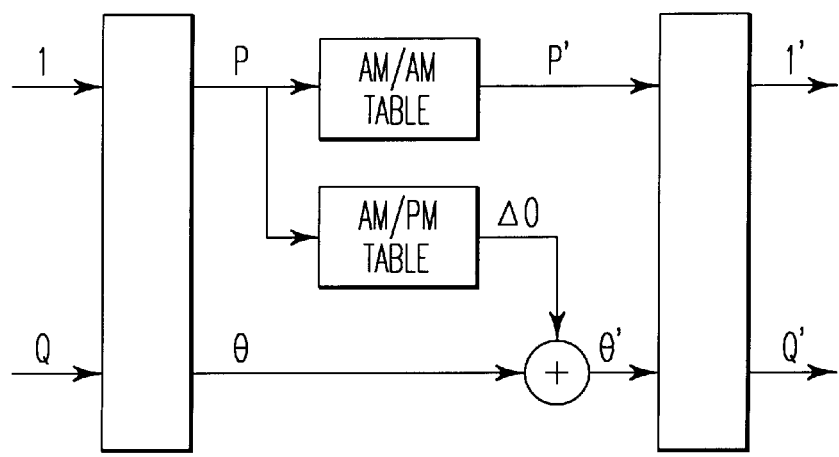

This step 9 of pre-correction therefore consists in applying the function which is the inverse of the transfer function of the amplifier of the transmission chain 10i, which is stored, as represented in FIG. 8, in AM/AM and AM/PM tables.

$$\rho'_k = f'(\rho_k) \quad \theta'_k = \theta'_k + \Delta\theta_k = \theta'_k + g'(\rho_k) \quad (12)$$

The pre-correction functions f' and g' are obtained as a function of the transfer functions f and g of the amplifier by solving the following system:

$$\begin{cases} \rho''_k = f(\rho'_k) = f(f'(\rho_k)) = G \cdot \rho_k \\ \theta''_k = \theta'_k + g(\rho'_k) = \theta_k + g(f'(\rho_k)) + g'(\rho_k) = \theta_k \end{cases} \quad (13)$$

with G the fixed gain of the corrector 24i-amplifier of the amplification chain 10i pair. i.e.:

$$\begin{cases} f'(\rho_k) = f^{-1}(G \cdot \rho_k) \\ g'(\rho_k) = -g(f^{-1}(G \cdot \rho_k)) \end{cases} \quad (14)$$

What is claimed as new and desired to be secured by Letters Patents of the United States is:

1. A Process for adjusting a transmission and a reception chain for each path formed by a base station of a system for radio communication with mobiles, said system including a transmission/reception antenna base and a multipath transmission/reception device, comprising after a step of calibrating the antenna base the following steps:

adjusting the reception chains related to each path by distributing a first specified adjustment signal synchronously over each of the reception chains and calculating an equalization filter which inverts the transfer functions related to each reception chain;

adjusting the transmission chains related to each path by distributing a second specified adjustment signal synchronously over each of the transmission chains, extracting from each of the paths a part of a transmission signal before the transmission signal is sent to the antenna base so as to re-inject said part into the reception chains, and calculating an equalization filter which inverts the transfer functions relating to each transmission chain;

receiving reception signals originating from the antenna base via the equalization filters previously calculated for the reception chains, or transmitting the transmission signals originating from the multipath transmission/reception device via the equalization filters previously calculated for the transmission chains.

2. Process according to claim 1, wherein, when a frequency of the transmission signal is different from a frequency of the reception signal, the step of adjusting the reception chains comprises the step of:

adjusting the reception chains to the frequency of the transmission signal so as to adjust the transmission chains.

3. Process according to claim 2, wherein a pre-correction performed on the transmission chain of each of the paths comprises inverting the amplitude and phase transfer functions of the amplifiers of the transmission chains of each of tie paths, measured in the analysis of the adjustment signals.

4. Process according to claim 2, wherein the analysis of the signals for adjusting the transmission chain comprises measuring differential gains between each of the paths after the equalization filtering of the reception chains on each of the paths.

5. Process according to claim 2, where the adjusting of the transmission chain of each of the paths is performed at a specified power so as to remain within the zone of linearity of the amplifier of the transmission chain.

6. Process according to claim 1, wherein a pre-correction performed on the transmission chain of each of the paths comprises inverting the amplitude and phase transfer functions of the amplifiers of the transmission chains of each of the paths, measured in the analysis of the adjustment signals.

7. Process according to claim 6, wherein the analysis of the signals for adjusting the reception chain comprises approximating the transfer function of the equalization filter of the reception chain via a method of least squares.

8. Process according to claim 6, wherein the analysis of the signals for adjusting the transmission chain comprises measuring differential gains between each of the paths after the equalization filtering of the reception chains on each of the paths.

9. Process according to claim 6, wherein the adjusting of the step of transmission chain of each of the paths is preformed at a specified power so as to remain within the zone of linearity of the amplifier of the transmission chain.

10. Process according to claim 1, wherein the analysis of the signals for adjusting the reception chain consists in approximating the transfer function of the equalization filter of the reception chain via a method of least squares.

11. Process according to claim 10, wherein the analysis of the signals for adjusting the transmission chain comprises measuring differential gains between each of the paths after the equalization filtering of the reception chains on each of the paths.

12. Process according to claim 10, wherein the adjusting of the transmission chain of each of the paths is performed at a specified power so as to remain within the zone of linearity of the amplifier of the transmission chain.

13. Process according to claim 1, wherein the analysis of the signals for adjusting the transmission chain consists in measuring differential gains between each of the paths after the equalization filtering of the reception chains on each of the paths.

14. Process according to claim 13, wherein the adjusting of the transmission chain of each of the paths is performed at a specified power so as to remain within the zone of linearity of the amplifier of the transmission chain.

15. Process according to claim 1, wherein the adjusting of the transmission chain of each of the paths is performed at a specified power so as to remain within the zone of linearity of the amplifier of the transmission chain.

16. A device configured to adjust transmission and reception chains of paths formed by a base station of a system for radio communication between mobiles, said system including a transmission/reception antenna base and a multipath transmission/reception device configured to implement the process according to claim 1, wherein the adjustment device is interfaced between the multipath transmission/reception device and the antenna base and includes for each path:

a transmission and reception chain;

an equalization filter for a transmission signal input-coupled to the transmission chain;

an equalization filter for a reception signal output-coupled to the reception chain;

an input switch and output switch for the transmission chain and the reception chain respectively configured to enable the adjustment device to enter various modes of operation: reception adjustment, transmission adjustment, transmission/reception;

a coupler placed at the output of the transmission chain after the output switch of the transmission chain and configured to extract a part of the transmission signal before the transmission signal is sent to the antenna base and to inject said part at an input of the reception chain; and the adjustment device includes in common for all the paths:

a first generator of a signal configured to adjust the transmission chains which are coupled to a first distribution module which distributes a first specified adjustment signal over the transmission chains of each of the paths by way of the input switch of the transmission chain;

a second generator of a signal configured to adjust the reception chains which are coupled to a second distribution module which distributes a second specified adjustment signal over the reception chains of each of the paths by way of the input switch of the reception chain; and an analyser of the adjustment signals configured to analyze the transmission and reception chain adjustment signals so as to adapt the equalization filters of the transmission and reception chains.

17. Device according to claim 16, wherein a pre-correction stage of the transmission chain is placed between the equalization filter of the transmission chain and the transmission chain.

18. Device according to claim 16, wherein the equalization filter of the reception chain is a finite impulse response filter whose coefficients are determined by a method of least squares.

19. Device according to claim 7, wherein the signal transmitted by the adjustment generator of the transmission chains is made up of orthogonal carriers, and in that it is transmitted simultaneously over each of the transmission chains.

20. Device according to claim 1, wherein the equalization filter of the transmission chain comprises a finite impulse response filter whose coefficients are determined by a method of least squares.

* * * * *